United States Patent [19]
Kondo

[11] 3,987,461
[45] Oct. 19, 1976

[54] PHOTOGRAPHIC CAMERA WITH AUTOMATICALLY CONTROLLED FILTER

[75] Inventor: Toshihiro Kondo, Chofu, Japan

[73] Assignees: Toshihiro Kondo, Chofu; Fuji Photo Film Co., Ltd., Minami-ashigara, both of Japan

[22] Filed: Sept. 4, 1975

[21] Appl. No.: 610,131

[30] Foreign Application Priority Data
Sept. 6, 1974   Japan .............................. 49-102800

[52] U.S. Cl. ................................ 354/43; 352/141; 354/271; 354/295
[51] Int. Cl.² ...................... G03B 7/08; G03B 9/00
[58] Field of Search ............... 354/22, 23, 26, 30, 354/43, 44, 45, 59, 152, 228, 270, 271, 354, 295; 350/314; 355/71; 352/141

[56]  References Cited
UNITED STATES PATENTS

| | | | |
|---|---|---|---|
| 3,209,667 | 10/1965 | Coutant | 352/141 X |
| 3,511,574 | 5/1970 | Burgarella | 354/59 X |
| 3,538,335 | 11/1970 | Tartanian | 352/141 X |
| 3,732,793 | 5/1973 | Tague | 354/354 |
| 3,860,943 | 1/1975 | Tague | 354/271 X |

Primary Examiner—L. T. Hix
Assistant Examiner—E. M. O'Connor

[57]   ABSTRACT

An optical filter the density of which is variable is provided in the optical path of the taking lens. The density of the filter is controlled to effect optimum exposure with freely selected aperture size and the shutter speed by means of an exposure control circuit. The density of the filter is varied by moving a filter operating member which is driven by a filter driving means. The stroke of the filter operating member is controlled by means operated by electric pulses generated by an electric circuit connected with a light measuring circuit including a photodetector to measure the scene brightness.

10 Claims, 11 Drawing Figures 3,987,461

PHOTOGRAPHIC CAMERA WITH AUTOMATICALLY CONTROLLED FILTER

CROSS REFERENCE TO RELATED APPLICATIONS

This application relates to subject matter similar to that disclosed in co-pending U.S. application Ser. No. 578,948 filed May 19, 1975 by the present inventor.

BACKGROUND OF THE INVENTION

1. Field of the Invention

This invention relates to an automatic exposure control camera, and more particularly to a photographic camera with an exposure control means wherein the aperture size of a diaphragm and the shutter speed are freely selected and the density of a filter is automatically controlled in accordance with the scene brightness.

2. Description of the Prior Art

In the conventional automatic exposure control camera, either the aperture size of a diaphragm or the shutter speed is freely selected in advance and the remaining one is automatically controlled by use of an exposure control circuit. In addition to this ordinary type of the automatic exposure control camera, it has also been known in the art to automatically select a combination of the aperture size and shutter speed from a group of predetermined combinations thereof in accordance with the scene brightness measured by use of an exposure measuring circuit and an exposure control circuit connected therewith. In these conventional automatic exposure control cameras, only two variables, i.e. the aperture size and the shutter speed, are used to determine the exposure. The film sensitivity is of course introduced into the exposure control means as input information to determine the exposure. Therefore, if one of the two variables is preselected, the other is automatically determined by the exposure control means.

However, in the photographic technique, the aperture size has an important role in addition to that of exposure control, namely, that of determining the focal depth. Further, the shutter speed also has an important role in addition to that of exposure control, namely, that of determining the degree of blur. Therefore, it is desirable to freely select both the aperture size and the shutter speed to obtain a photograph of desirable sharpness and blur. As described hereinabove, in the conventional photographic cameras with an exposure control means, it has been impossible to freely select both the aperture size and the shutter speed.

SUMMARY OF THE INVENTION

In view of the above description of and observations regarding the conventional photographic cameras with an exposure control means, it is the primary object of the present invention to provide a photographic camera with an exposure control means in which both the aperture size and the shutter speed can freely be selected.

Another object of the present invention is to provide a photographic camera having a density-variable optical filter which is controlled to vary its density in accordance with the scene brightness to obtain photographs of optimum exposure by use of an exposure control means.

Still another object of the present invention is to provide a photographic camera having a density-variable optical filter comprising a pair of polarization filters one of which is rotated with respect to the other to vary the density or the transmittivity thereof by an exposure control means.

A further object of the present invention is to provide a photographic camera having a density-variable optical filter the density of which is automatically controlled by means of an exposure control means in which the density of the filter is varied by moving a mechanical movable member in the camera, the start and stop of the movable member being controlled by an electric circuit employing a pair of electromagnets.

A still further object of the present invention is to provide a photographic camera having a density-variable optical filter the density of which is automatically controlled by means of an exposure control means in which a mechanical movable member to vary the density of the filter is moved by an electromagnetic force and completely controlled by use of an electric circuit.

The above objects are accomplished by providing an optical filter in the optical path of the taking lens the optical density or transmittivity of which optical filter is automatically varied by means of an exposure control means including a light measuring circuit in which two factors, the aperture size of diaphragm and the shutter speed, are taken into account.

In the photographic camera in accordance with the present invention, a filter operating member which is moved to vary the density of the density-variable optical filter is controlled of its stroke of movement by use of means operated by electric pulses generated by an electric circuit connected to a light measuring circuit.

In order to drive said filter operating member to vary the density of an optical filter, a filter driving means is used. As the filter driving means, any kind of driving means can be employed such as a spring, an electric motor, a combination of a permanent magnet and an electromagnetic coil, and gas pressure.

As the density-variable optical filter, there can be used any of various kinds of optical filters the density or transmittivity of which can be varied such as a pair of polarization filters one of which is rotatable with respect to the other, a pair of optical pattern plates one of which is rotated or moved with respect to the other to vary or change the total amount of light passing therethrough (hereinafter described in detail), or a liquid density filter the thickness of which can be varied to vary the transmittivity thereof. Filters of such type whose density or light transmittivity is variable will hereinafter be referred to generally as "density-variable optical filters" or simply as "variable filters".

In this invention, the above variable filter is controlled by use of a ratchet hook which is driven by an electromagnet connected with a control circuit. The ratchet hook is releasably engaged with a ratchet gear for operating a filter driving means and repeatedly put into engagement with and released from the ratchet gear by pulses transmitted to the electromagnet so that the stroke of the movement of the ratchet gear may be controlled by the number of pulses.

As will be understood from the above description, the present invention can be embodied in a variety of combinations of filter driving means and the density-variable optical filter.

In the present invention, it should be noted that the sensitivity of the film used must be considerably high in comparison with that of the film used in the conventional photographic cameras, since the quantity of incident light is attenuated by the variable filter. In practical use, the sensitivity of the film used in the camera according to this invention should preferably be over ASA3000. As an example of such high-sensitivity film which is commercially available, is known "TYPE 410" made by Polaroid Corporation the sensitivity of which is ASA10000.

DESCRIPTION OF THE PREFERRED EMBODIMENTS

A first embodiment of the present invention in which a spring is used for driving a filter operating member and a pair of polarization filters are used as the variable filter will hereinbelow be described in detail referring to FIGS. 1 to 3.

Figure 1:
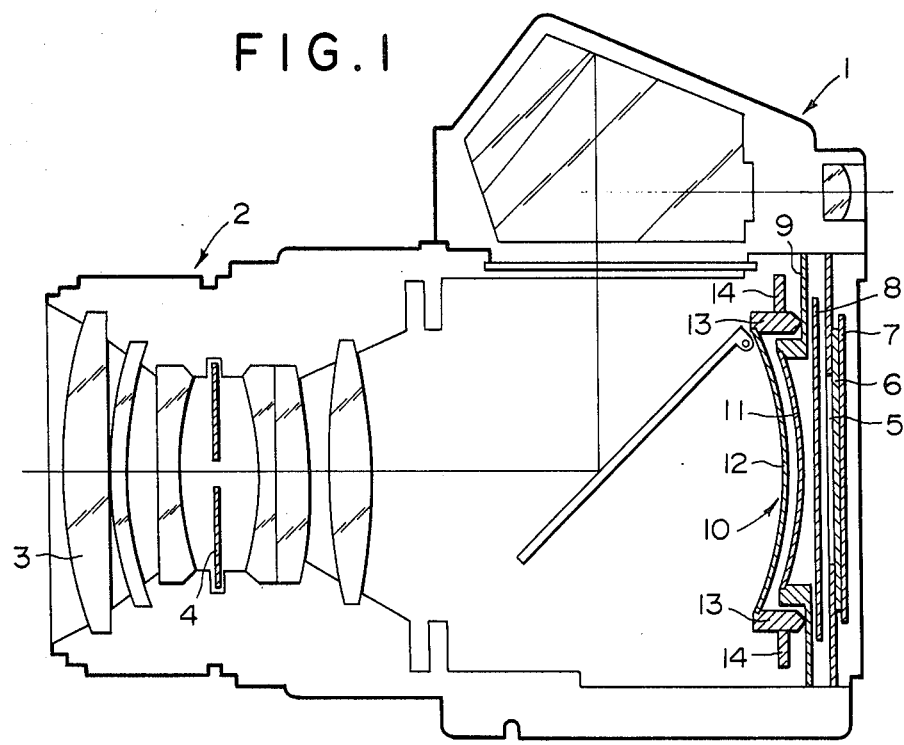
FIG. 1 is a schematic longitudinal sectional view of a photographic camera provided with a density-variable optical filter comprising a pair of polarization filters in accordance with an embodiment of the present invention.

FIG. 1 illustrates a single lens reflex camera in which the present invention is embodied. A camera body 1 is provided with a lens barrel 2 on the front face thereof. The lens barrel 2 is provided with a taking lens system 3 and a diaphragm 4. In the back of the camera body 1 is provided an aperture plate 5 on the back of which is pressed a film 6 by a film pressure plate 7. In front of the aperture plate 5 is provided a focal plane shutter 8. In front of the focal plane shutter 8 is provided a fixed plate 9 to which a variable filter 10 is mounted. The variable filter 10 is comprised of a fixed polarization filter 11 fixed to the plate 9 and a rotatable polarization filter 12 fixed to a rotatable ring 13. The rotatable ring 13 rotates about the optical axis of the taking lens 3 and supports the rotatable polarization filter 12 in parallel to the fixed polarization filter 11. The ring 13 is provided with a flange 14 on the outer periphery thereof which flange 14 is provided on the periphery thereof with teeth 14a as shown in FIG. 2.

Figure 2:
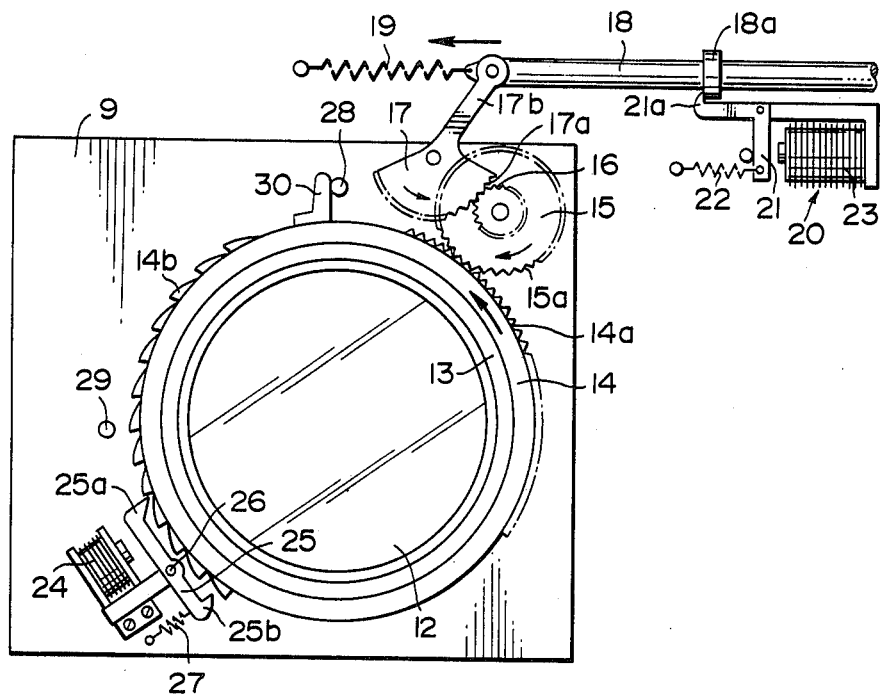
FIG. 2 is a front view showing a filter operating mechanism employed in the first embodiment of the present invention in which polarization filters are employed.
Figure 3:
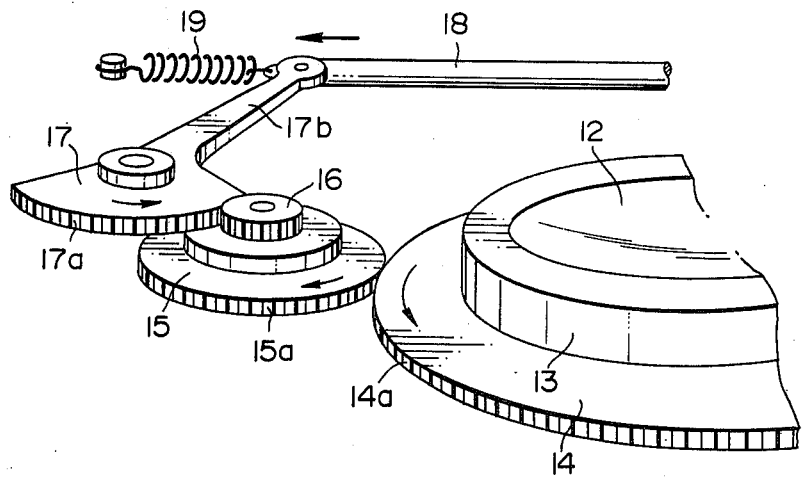
FIG. 3 is a fragmentary perspective view showing a part thereof.

Referring to FIG. 2, the teeth 14a are meshed with teeth 15a of a spur gear 15 rotatably mounted on said fixed plate 9. The spur gear 15 has a concentrically mounted pinion 16 which is in turn meshed with teeth 17a of a sector gear 17 rotatably mounted on the fixed plate 9. The sector gear 17 has a lever 17b at one end thereof which lever is pivotally connected with a filter setting rod 18. The filter setting rod 18 is connected with a tension spring 19 at an end thereof so that the rod 18 is pulled leftward in FIG. 2 by the tension thereof. The filter setting rod 18 is provided with a flange 18a which is brought into engagement with a hook 21a of a locking lever 21 when the rod 18 is slid to the right. The locking lever 21 is pivotally oriented and spring-urged clockwise by aa tension spring 22. An electromagnet 23 is provided to make the locking lever 21 rotate counterclockwise so that the a 21a thereof may be disengaged from the flange 18a of the rod 18. When the shutter is charged and the film is wound up, the filter setting rod 18 is slid to the right overcoming the tension of the spring 19 and the flange 18a is brought into engagement with the hook 21a of the locking lever 21 and held in the right position thereby. The locking lever 21 and the electromagnet 23 constitute a locking means 20. When the shutter is released, or, more precisely, immediately before the shutter release, the locking means 20 releases the filter setting rod 18. Upon receipt of a shutter release signal, the electromagnet 23 is energized to disengage the hook 21a from the flange 18a of the rod 18 and let the rod 18 slide to the left by the tension of the spring 19. By the leftward movement of the filter setting rod 18, the sector gear 17 is rotated counterclockwise and the spur gear 15 is rotated clockwise and accordingly the rotatable ring 13 is rotated counterclockwise.

In the ready state where the filter setting rod 18 is in its right most position as shown in FIG. 2, the rotatable polarization filter 12 is in the position to make the transmittivity of the polarization filter combination composed of the fixed filter 11 and the rotatable filter 12 the lowest. When the rotatable filter 12 is rotated by 90° from said position, the transmittivity of the polarization filter combination 11 and 12 becomes the highest. As is well known in the art, the transmittivity of the polarization filter combination 11 and 12 can be varied by rotating polarization filter 12 with respect to the fixed polarization filter 11. By stopping the rotation of the rotatable ring 13 in the course of the rotation thereof, an intermediate value of transmittivity can be obtained.

Said flange 14 fixed to the rotatable ring 13 is further provided on the periphery thereof with stopper teeth 14b.

Figure 4:
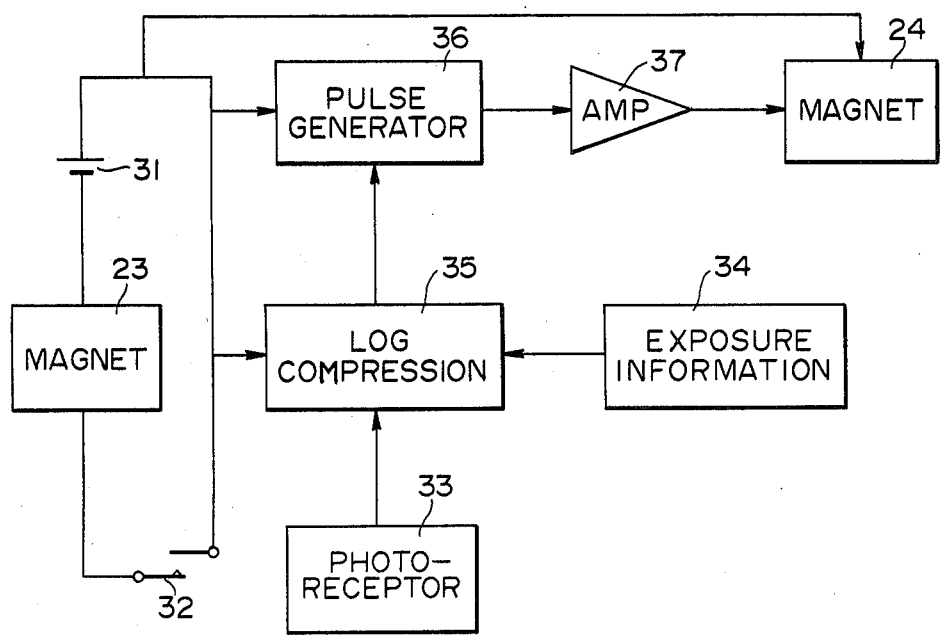
FIG. 4 is a block diagram showing an example of an electric circuit employed in the present invention for operating a filter controlling means in accordance with the scene brightness measured by a photodetector employed therein.

An electromagnet 24 which is intermittently energized by pulse current from a control circuit as shown in FIG. 4 is provided in the vicinity of the rotatable ring 13. The electromagnet 24 is provided with a ratchet hook lever 25 pivotally mounted to a pivot 26 fixed to the electromagnet 24. The ratchet hook lever 25 has hook portions 25a and 25b at both ends thereof respectively and one end thereof having a hook portion 25b is pulled in such a direction by means of a tension spring 27 that the other end thereof having a hook portion 25a is separated from the electromagnet 24. Either of the hook portions 25a and 25b of the hook lever 25 is engaged with said stopper teeth 14b to prevent the rotatable ring 13 from rotating. When the electromagnet 24 is energized, the hook portion 25a is attracted thereby to disengage the hook portion 25b from the teeth 14a and the other hook portion 25b is put into engagement with the teeth 14b. When the electromagnet 24 is deenergized, the hook portion 25a is put into engagement with the teeth 14b and the other hook portion 25b is disengaged from the teeth 14b as shown in FIG. 2. By repeating the above operation, the rotatable ring 13 is rotated step by step in the counterclockwise direction if the rotatable ring 13 is urged counterclockwise. One side of the teeth 14b is slanted so that the rotatable ring 13 can freely rotate clockwise without being stopped by the hook portions 25a and 25b.

The rotatable ring 13 has a radially extending projection 30 which is stopped by a pair of pins 28 and 29 fixed to the plate 9 to limit the rotation of the ring 13. One pin 28 is to limit the rotation of the ring 13 when the filter is set, and the other pin 29 is to stop the ring 13 at a position of the maximum transmittivity.

In operation of the above described first embodiment of the invention, the filter setting rod 18 is moved to the right when the film is wound up and the flange 18a thereof is brought into engagement with the hook 21a of the locking lever and the rod 18 is held by the locking means 20 in its right position where the projection 30 abuts on the stopper 28. The rotatable ring 13 is not stopped by the hook portions 25a and 25b when the ring 13 is rotated clockwise as mentioned above. Thus, the variable filter 10 is set to have the minimum density.

When the shutter is released, the electromagnet 23 of the locking means 20 is energized to disengage the hook, 21a of the locking lever 21 from the flange 18a of the filter setting rod 18 and the rod 18 is moved to the left by the tension of the tension spring 19. By the leftward movement of the filter setting rod 18, the sector gear 17 is rotated counterclockwise and the rotatable ring 13 holding the rotatable polarization filter 12 is rotated counterclockwise by way of the pinion 16 and the spur gear 15. By the counterclockwise rotation of the rotatable polarization filter 12, the light transmittivity of the polarization filter combination 11 and 12 is increased.

In the course of the counterclockwise rotation of the rotatable polarization filter 12, said electromagnet 24 is intermittently energized by pulses and the hook portions 25a and 25b of the hook lever 25 is alternately brought into engagement with the stopper teeth 14b and makes the ring 13 stop at a position where the density or transmittivity of the variable filter 10 is determined by the angle of rotation. The angle of rotation of the rotatable filter 12 is determined by the number of pulses given to the electromagnet 24, since the rotatable ring 13 is rotated by the repeated swing of the hook lever 25 repeated number of times corresponding to the number of pulses given to the electromagnet 24. In this embodiment, the larger the number of pulses, the higher the transmittivity of the variable filter 10.

In order to energize the electromagnets 23 and 24, a control circuit such as shown in FIG. 4 is used. Referring to FIG. 4, the electromagnet 23 is connected in series with a power source 31 and a switch 32. The switch 32 is closed in response to the release of the shutter. A photoreceptor 33 and an exposure information setting means 34 are connected with a log compression means connected with a pulse generating means 36 to input the exposure information into the pulse generating means 36. The exposure information setting means 34 are provided with variable resistors for input of shutter speed and aperture size. As for the aperture size, it is possible to eliminate the variable resistor by providing a photoreceptor behind the aperture of the lens and measuring the scene brightness according to a stopped-down measurement system. The log compression means 35 computes the output of the photoreceptor 33 and the output of the exposure information setting means 34 and log-compresses the computed value. The output of the log compression means 35 is transmitted to the pulse generator 36 and pulses of the frequency corresponding to the output of the log compression means 35 indicative of the exposure information including the scene brightness are generated by the pulse generator 36 for a predetermined period. An amplifier 37 is connected with the pulse generator 36 to give amplified pulses to the magnet 24.

In operation of the above described electric circuit as shown in FIG. 4, the switch 32 is closed immediately before the shutter is released to energize the electromagnet 23 which starts the filter setting rod 18 and makes the rotatable polarization filter 12 rotate. Simultaneously with the start of the rotatable filter 12, the photoreceptor 33 starts to measure the scene brightness and the measured scene brightness information is introduced into the log compression means 35 together with the exposure information regarding the aperture size and the shutter speed. The output of the log compression means 35 is supplied to the pulse generator 36 to have the generator generate pulses with the frequency corresponding to the log-compressed exposure information for a predetermined period. Therefore, pulses of the number indicative of the exposure information is given to the electromagnet 24 after amplified. The electromagnet 24 is accordingly energized intermittently and repeatedly swing the hook lever 25 to advance or rotate counterclockwise the rotatable ring 13 of the variable filter 10 to the extent corresponding to the number of pulses given thereto. By the rotation of the rotatable ring 13, the light transmittivity of the variable filter 10 is controlled to effect the optimum exposure on the film 6 in the camera. The lower is the scene brightness, the larger becomes the number of pulses given to the electromagnet 24 and accordingly the higher becomes the light transmittivity of the variable filter 10. After the rotatable filter 12 is stopped, that is after the density or transmittivity of the variable filter 10 has been determined, the shutter is released to obtain a photograph of optimum exposure. After the shutter is released, the switch 32 is opened and the electromagnet 23 is deenergized to return the lever 21 to its initial position.

Figure 5:
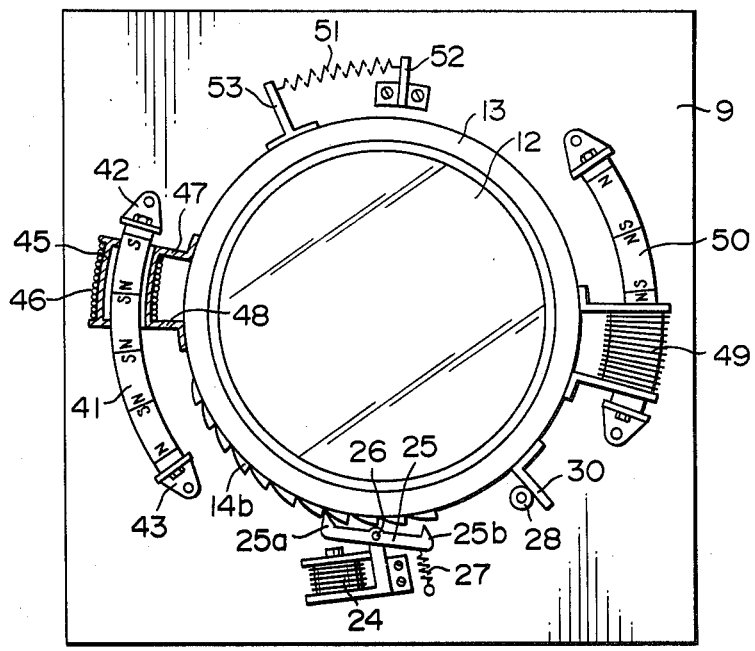
FIG. 5 is a front view showing a filter operating mechanism employed in the second embodiment of the present invention.
Figure 6:
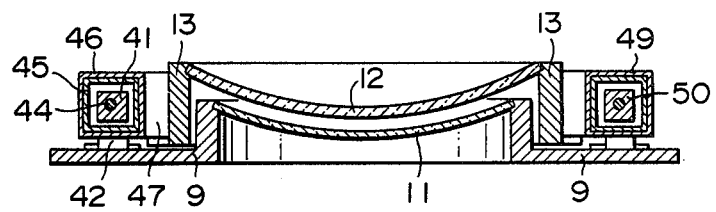
FIG. 6 is a sectional view of the filter operating mechanism employed in the second embodiment of the invention.

A second embodiment of the present invention will now be described with reference to FIGS. 5 and 6 in which a rotatable ring for controlling the transmittivity of the filter is driven by electromagnetic force without using a spring driving means. Those elements which are the same as those employed in the first embodiment shown in FIGS. 1 to 3 are indicated with the same reference numerals and the description thereof is omitted here. Referring to FIG. 5, an arcuate permanent magnet 4 composed of several magnets connected in a line supported by a pair of support members 42 and 43 fixed to the fixed plate 9 is provided near the rotatable ring 13 concentrically therewith. Said several magnets forming the permanent magnet 41 have a square cross-section as shown in FIG. 6 and are assembled together by means of an assemblying bar 44 which extends through holes of the magnets. The rotatable ring 13 is provided with an electromagnetic coil 46 which encircles the arcuate permanent magnet 41. The coil 46 is wound on a bobbin 45 fixed to the rotatable ring 13 by a pair of feet 47 and 48. The permanent magnet 41 and the electromagnetic coil 45 work to rotate the rotatable ring 13 counterclockwise when the electromagnetic coil 45 is energized. On the opposite side of the rotatable ring 13 is provided another permanent magnet 50 similar to the magnet 41, and another electromagnetic coil 49 is fixed to the rotatable ring 13 to constitute another electromagnetic driving means together with the permanent magnet 50. The electromagnetic driving means comprising the magnet 50 and the coil 49 work to rotate the rotatable ring 13 clockwise when the coil 49 is energized.

A tension spring 51 for holding the rotatable ring 13 in the position to make the light transmittivity of the variable filter 10 the minimum is tensioned between a support 52 fixed to the fixed plate 9 and a support 53 fixed to the rotatable ring 13. If the tension of the spring 51 is sufficiently large, the electromagnetic driving means for rotating the rotatable ring 13 clockwise can be eliminated.

In order to operate the device in accordance with the second embodiment of the invention as shown in FIGS. 5 and 6 by use of the electric circuit as shown in FIG. 4, the electromagnetic coil 46 is connected in the circuit instead of the electromagnet 23. When the electromagnet 49 is used together with the magnet 50, the circuit is so constructed that the electromagnet 49 is energized upon release of the shutter and deenergized upon completion of the clockwise rotation of the ring 13.

In operation of the second embodiment of the present invention, the electromagnetic coil 46 is energized upon closure of the switch 32 in response to the release of the shutter, and the rotatable filter driving ring 13 is urged to rotate counterclockwise. On the other hand, the hook lever 25 is vibrated by the pulses supplied from the amplifier 37 to allow the counterclockwise rotation of the rotatable ring 13. The angle of rotation of the rotatable ring 13 is determined by the number of pulses and the light transmittivity of the variable filter is controlled in accordance with the exposure information including the scene brightness. When the shutter is closed, the switch 32 is opened upon the return of the shutter release button and the coil 49 is energized to rotate the rotatable ring 13 until the projection 30 abuts on the limit pin 28. In case where the coil 49 is not used, the rotatable ring 13 is rotated clockwise by the tension of the spring 51.

Although in the above described embodiments of the invention the angle of rotation of the rotatable ring 13 to control the density or light transmittivity of the variable filter is controlled by a hook lever 25 and teeth 14b formed on the periphery of the rotatable ring 13, it will be noted that the rotatable ring 13 may be provided with a ratchet wheel to be rotated directly by a solenoid or the like in one direction which is driven repeatedly by pulses. In this case, there is no need to provide a driving means beside the solenoid or the like, and accordingly, the structure of the camera can be simplified.

Although in the above described first embodiment of the invention a spring 19 is used as the filter driving means, various other means can be replaced therefor as mentioned before. For instance, said lever 17b of the sector gear 17 may be connected to a plunger or the like which is driven by electromagnetic force or the sector gear 17 may be mounted on a shaft of a motor. The rotatable ring 13 can be directly rotated by electromagnetic force or the like.

In any type of filter driving means, the stroke of the rotation of the rotatable filter is controlled by use of an electromagnet which is operated by an electric circuit as described above and shown in FIG. 4. The mechanical interlocking means for transmitting the driving force of the driving means to the rotatable filter operating member may be of any type as is obvious to those skilled in the art.

On the other hand, as the variable filter used for varying the light transmittivity through the taking lens system, a pair of pattern plates each being composed of light transmitting parts and light intercepting parts the light transmittivity through which pair is varied by moving or rotating one of the pair with respect to the other can be employed. Or a continuously density changing optical density filter can be employed as the variable filter. For instance, a photographic film on which several steps of density patterns are recorded can be used as the variable filter by selectively bringing one of the patterns into alignment with the optical axis of the taking lens. The density patterns may be recorded in infinitive steps, i.e. continuously, so that the light transmittivity may be continuously changed by moving the film in the direction perpendicular to the optical axis. Alternatively, several ND filters of different density can be used as the variable filter by mounting the several ND filters of different density to a filter turret which is rotatable about its center and selecting one of the filters by rotating the turret. In each case, the movement or rotation of the film or turret is controlled by the exposure control means including two electromagnets in the same way as that employed in the aforementioned embodiment.

Figure 7A:
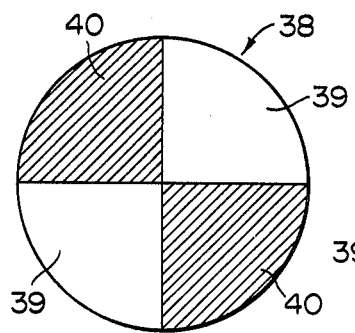
FIGS. 7A and 7B are front views showing an example of optical pattern plates serving as a variable filter employed in this invention.
Figure 7B:
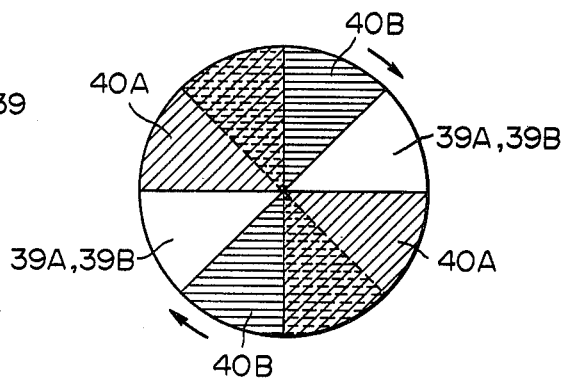
Figure 8A:
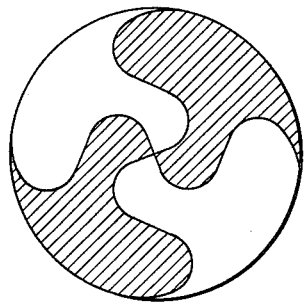
FIGS. 8A and 8C are front views showing other examples of the optical pattern plates.
Figure 8B:
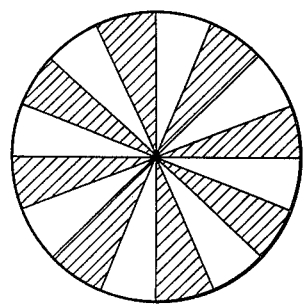
Figure 8C:
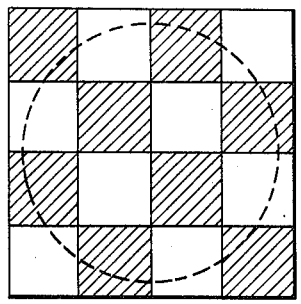

Several examples of the pattern plates a pair of which constitutes the variable filter will be described in detail referring to FIGS. 7A, 7B and 8A to 8C. FIGS. 7A and 7B show a basic example of the pattern plate. A pattern plate 70 as shown in FIG. 7A has transparent parts 71 and opaque parts 72. Two of the pattern plates 70 are superposed and located in the vicinity of the diaphragm of the camera and one of the plates 71A is rotated with respect to the other 71B as shown in FIG. 7B. When the pattern of one plate 71A is completely aligned with the pattern of the other plate 71B, the transmittivity of the superposed plates 71A and 71B is the maximum. As one plate 71A rotates with respect to the other, the transmittivity is lowered. FIG. 7B shows the state where one plate 71A is rotated at 45° with respect to the other plate 71B and the transmittivity of the pair of plates 70 is lowered to half of that in the state as shown in FIG. 7A. FIGS. 8A to 8C show other examples of the pattern which can be employed for the pattern plate used in the invention as the variable filter. The pattern shown in FIG. 8C is for a pattern plate which is not rotated but is linearly slid with respect to the other to vary the transmittivity.

I claim:

1. A photographic camera wherein the aperture size of a diaphragm and the shutter speed are freely selectable and the density of a filter is automatically controlled in accordance with the scene brightness comprising in combination:
    a diaphragm the aperture size of which is freely selectable by manual operation,
    a shutter the exposure time of which is freely selectable by manual operation, a light measuring circuit which measures the scene brightness and gives an output corresponding to the measured scene brightness taking the selected aperture size and the selected shutter speed into account, a density-variable filter located on the optical axis of a taking lens of the camera the density or light transmittivity of which is variable, a filter operating means for varying said density of the density-variable filter, a control means driven by pulses for controlling said filter operating means to vary said density of the filter in accordance with the number of pulses supplied thereto, and a pulse generating circuit which controls the number of pulses supplied to said control means, said light measuring circuit being connected with said pulse generating circuit for controlling the number of pulses in accordance with said output of the light measuring circuit.

2. A photographic camera as claimed in claim 1 wherein said density-variable filter comprises a pair of superposed polarization filters one of which is rotatable with respect to the other.

3. A photographic camera as claimed in claim 2 wherein one of said pair of polarization filters is fixed in the camera and the other of said pair of polarization filters is rotatably mounted in the camera, and said filter operating means is connected with the rotatable polarization filter to rotate the same.

4. A photographic camera as claimed in claim 1 wherein said filter operating means comprises a movable member which varies the density of the filter by the movement thereof, and a driving means for moving said movable member.

5. A photographic camera as claimed in claim 4 wherein said driving means is a spring which is charged by an operation to wind up the film in the camera.

6. A photographic camera as claimed in claim 4 wherein said driving means is an electromagnetic driving means comprising a permanent magnet and electromagnetic coil slidably engaged therewith, one of said permanent magnet and said coil being fixed or connected with said movable member so that the energization of said electromagnetic coil may move said movable member.

7. A photographic camera as claimed in claim 4 wherein said driving means is an electric motor, the shaft of the motor being fixed or connected with said movable member.

8. A photographic camera as claimed in claim 7 wherein the start and stop of the motor are conducted by said electromagnetic starting means and said electromagnetic stopping means, respectively.

9. A photographic camera as claimed in claim 4 wherein said movable member is provided with teeth and urged in one direction by said driving means, said control means comprises an electromagnet connected with said pulse generating circuit to be energized by the pulses therefrom and a hook lever engaged with said teeth and driven by said electromagnet to be released from the teeth to allow the movable member to move by one pitch of the teeth.

10. A photographic camera as claimed in claim 9 wherein said hook lever has two hook portions at the opposite ends thereof and pivotally mounted to a fixed shaft at the intermediate part thereof being spring-urged to swing in one direction about the shaft to make one hook portion engage with said teeth, said hook lever bring swung in the opposite direction by said electromagnet when the electromagnet is energized to make the other hook portion engage with said teeth.

* * * * *